US012705796B1

(12) United States Patent
Fortin-Deschenes et al.

(10) Patent No.: US 12,705,796 B1
(45) Date of Patent: Aug. 11, 2026

(54) VESTIBULO-OCULAR REFLEX BASED EYE TRACKING PREDICTION

(71) Applicant: Apple Inc., Cupertino, CA (US)

(72) Inventors: Simon Fortin-Deschenes, Santa Clara, CA (US); Axit H Patel, Sunnyvale, CA (US); Ritesh Gangadhar Sholapur, San Carlos, CA (US); Seyedkoosha Mirhosseini, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/731,113

(22) Filed: May 31, 2024

Related U.S. Application Data

(60) Provisional application No. 63/505,998, filed on Jun. 2, 2023.

(51) Int. Cl.
*G06T 7/73* (2017.01)
*G06F 3/01* (2006.01)
*G06T 5/80* (2024.01)

(52) U.S. Cl.
CPC ................ *G06T 7/75* (2017.01); *G06F 3/012* (2013.01); *G06F 3/013* (2013.01); *G06T 5/80* (2024.01); *G06T 2207/30201* (2013.01)

(58) Field of Classification Search
CPC ... G06T 7/75; G06T 5/80; G06T 2207/30201; G06F 3/012; G06F 3/013
See application file for complete search history.

(56) References Cited

U.S. PATENT DOCUMENTS 8,736,692 B1 * 5/2014 Wong .................. H04N 9/3173 348/208.4
9,788,714 B2 10/2017 Krueger
10,231,614 B2 3/2019 Krueger
11,614,798 B2 * 3/2023 Muehlhausen ......... G06F 3/013 345/156
2015/0212576 A1 * 7/2015 Ambrus ................ G06F 3/0482 345/156
2016/0262608 A1 * 9/2016 Krueger ................. G16H 40/63
2017/0123215 A1 * 5/2017 Li ........................ H04N 13/383
2019/0204913 A1 * 7/2019 Sarkar ................ G02B 27/0093
2021/0405741 A1 * 12/2021 Nouri ...................... G06F 3/013
2022/0103805 A1 * 3/2022 Huang ................. H04N 13/383
2022/0113794 A1 * 4/2022 Ohba .................. H04N 13/122

FOREIGN PATENT DOCUMENTS

CN 110710977 1/2020

* cited by examiner

*Primary Examiner* — Mihir K Rayan

(74) *Attorney, Agent, or Firm* — Robert C. Kowert; Kowert, Hood, Munyon, Rankin & Goetzel, P.C.

(57) ABSTRACT

A vestibulo-ocular reflex (VOR) eye tracking prediction method leverages head tracking functionality of a device to predict and compensate for latency caused by the VOR. Head motion may be accurately detected and predicted by a head tracking system of the device. The head motion prediction may be leveraged to predict where the eye with the assumed VOR motion will be looking when an image is displayed. In the method, head motion is detected, images of the eyes are captured, and the predicted head motion is used to predict VOR motion and thus pupil position and gaze direction so that an image is rendered with corrections and displayed with a more accurate pupil position and gaze direction than can be obtained with naïve gaze direction estimated based on images of the eyes captured by the eye-facing cameras that does not account for VOR, and thus introduces latency.

20 Claims, 10 Drawing Sheets

W: world
D: display node
E: eye center (display aligned)
P: pupil
f: focus point (assumed static)

x and x' represent the same node at times $t_e$ (eye camera mid exposure) and $t_p$ (display mid exposure)

VESTIBULO-OCULAR REFLEX BASED EYE TRACKING PREDICTION

PRIORITY APPLICATION

This application claims benefit of priority to U.S. Provisional Application Ser. No. 63/505,998, entitled "Vestibulo-Ocular Reflex Based Eye Tracking Prediction," filed Jun. 2, 2023, and which is hereby incorporated herein by reference in its entirety.

BACKGROUND

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for vestibulo-ocular reflex (VOR) eye tracking prediction in a device, for example head-mounted devices (HMDs) including but not limited to HMDs used in extended reality (XR) applications and systems, are described. HMDs may include wearable devices such as headsets, helmets, goggles, or glasses. An XR system may include an HMD which may include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses. Alternatively, the HMD may include opaque display screens positioned in front of the user's eyes via which images or video of the environment captured by the one or more cameras can be displayed for viewing by a user, possibly augmented by virtual content in an XR system, and typically through optics or eyepieces positioned between the displays and the user's eyes.

In a device that implements an eye tracking system, the eye tracking system tracks the position of the pupil based on images of the eyes captured by eye-facing cameras to determine gaze direction; the distortion correction is updated (e.g., for each frame) for the eyepiece. The distortion correction may be updated during rendering or during post-processing of rendered images, for example. The distortion correction may be applied to images to be displayed based on the current gaze direction, for example to minimize "wobble" in the image displayed by the device. The distortion correction may be applied to make distortion corrections, as well as corrections for chromatic aberrations, optical crosstalk, foveation, vignetting, and point of view correction. However, latency between the time the eye-facing cameras capture the image(s) and the time the content is displayed introduces error. Head motion, and especially the VOR, can contribute to "wobble" in the image; in particular, the latency in the position of the pupil (and thus the gaze direction) determined by the eye tracking system may cause problems, as the pupil position and gaze direction at the time distortion is applied and the image displayed may be different than the pupil position and gaze direction estimated from images of the eyes captured by the eye-facing cameras. For example, if VOR is occurring at a medium-high speed, up to half a millimeter (mm) of error in the position of the pupil (and thus the gaze direction) may occur. Given that a total budget for error may be approximately 1 mm, VOR is a significant source of error.

Embodiments of a vestibulo-ocular reflex (VOR) eye tracking prediction method and apparatus are described that leverage head tracking functionality of the device to predict and compensate for latency caused by the VOR. In some embodiments, it may be assumed VOR motion is occurring all the time when a user is wearing the device. Head motion may be accurately detected and predicted by a head tracking system of the device based on input from an inertial motion unit (IMU), input from world-facing camera(s), or by other methods or combinations of methods. Embodiments may leverage this available head motion prediction in order to predict where the eye with the assumed VOR motion will actually be looking when an image is displayed by the system. In the method, head motion is detected, images of the eyes are captured, and the predicted head motion is used to predict VOR motion and thus gaze direction so that an image is rendered with corrections and displayed with a more accurate gaze direction than can be obtained with naïve head motion prediction and a gaze direction estimated based on images of the eyes captured by the eye-facing cameras that does not account for VOR, and thus introduces latency.

In some embodiments, a VOR prediction algorithm as described herein receives as input a current or initial eye pose generated by an eye tracking component, a device/head pose generated by a head tracking component, and the display time (the time when the current frame is to be displayed). In addition, the VOR prediction algorithm also obtains a device/head pose that was generated at the time the eye tracking image that was used to generate the eye pose was captured. Thus, VOR prediction algorithm thus has two device/head poses as input; the difference between these two device/head poses is used to modify the eye pose obtained from eye tracking to account for the inherent latency between the time the image of the eye was captured and the time that the current frame will be displayed. The VOR prediction algorithm outputs the predicted eye pose information to a compositor, which used the predicted eye pose to adjust corrections to the current frame for display.

Figure 1:
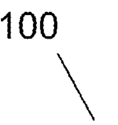
FIG. 1 illustrates the vestibulo-ocular reflex (VOR) in a device that includes an eye tracking system, according to some embodiments.
Figure 1:
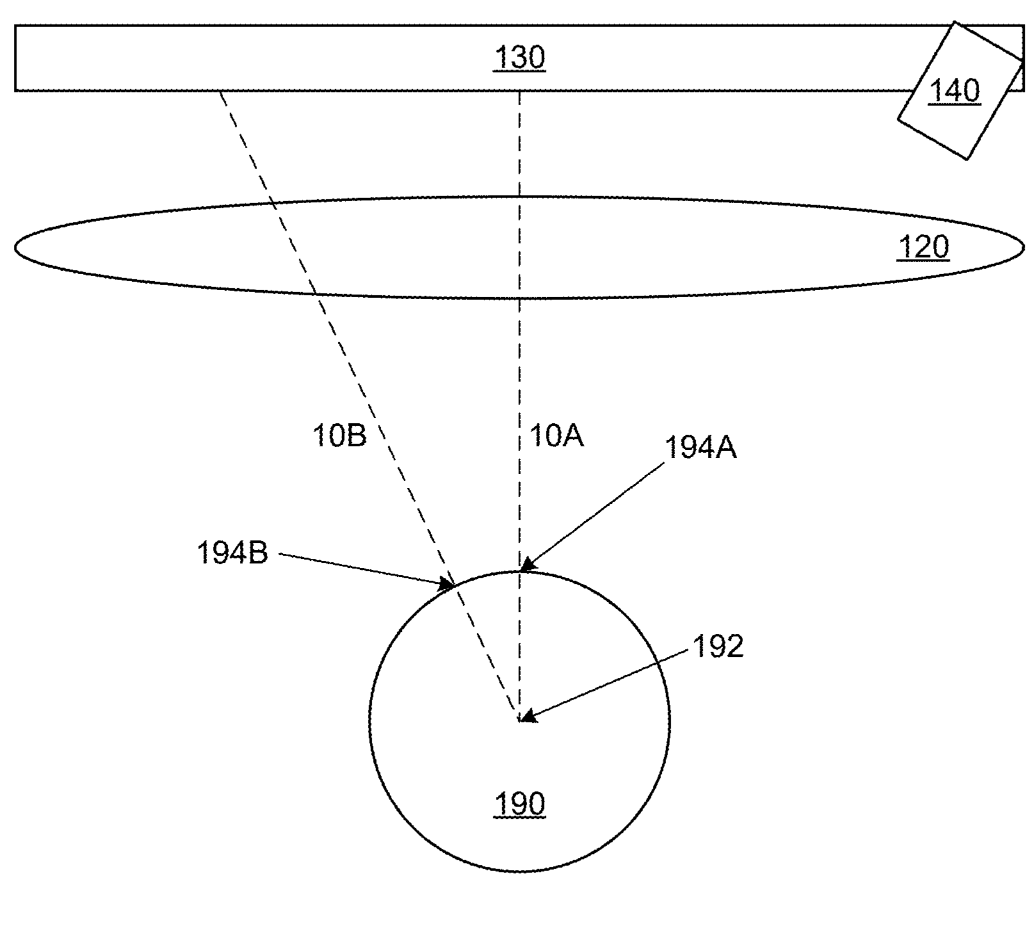

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for vestibulo-ocular reflex (VOR) eye tracking prediction on a device, for example head-mounted devices (HMDs) including but not limited to HMDs used in extended reality (XR) applications and systems, are described. HMDs may include wearable devices such as headsets, helmets, goggles, or glasses. An XR system may include an HMD which may include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses. Alternatively, the HMD may include opaque display screens positioned in front of the user's eyes via which images or video of the environment captured by the one or more cameras can be displayed for viewing by a user, possibly augmented by virtual content in an XR system, and typically through optics or eyepieces positioned between the displays and the user's eyes.

In at least some systems, the HMD may include eye or gaze tracking technology. In an example eye tracking system, one or more infrared (IR) light sources emit IR light towards a user's eye. A portion of the IR light is reflected off the eye and captured by an eye tracking camera. Images captured by the eye tracking camera may be input to a glint and pupil detection process, for example implemented by one or more processors of a controller of the HMD. Results of the process are passed to a gaze estimation process, for example implemented by one or more processors of the controller, to estimate the user's current point of gaze. This method of gaze tracking may be referred to as PCCR (Pupil Center Corneal Reflection) tracking. Note that the gaze tracking may be performed for one or for both eyes.

Accurate eye tracking is required for several reasons including but not limited to dynamic display distortion and color correction, and is especially important as displays get smaller. Latency in eye tracking is one of the main sources of error in an eye tracking system, and thus methods are needed to minimize the error caused by latency.

A device that implements eye tracking may include a display positioned in front of the user's eyes, and eyepieces located between the user's eyes and the display. Dynamic display distortion may be applied to images to be displayed to account for distortion caused by the lenses with respect to the user's current gaze direction as detected by the eye tracking system. Color correction or other image corrections may also be applied to frames based on the current gaze direction as detected by the eye tracking system.

The vestibulo-ocular reflex (VOR) is a reflex eye movement that stabilizes images on the retina during head movement. The VOR constrains eye movement to the inverse of head movement when fixating on an object and moving the head. In other words, when a person is looking at an object and rotates the head, the eyes rotate in a direction opposite to the head motion. This occurs on all axes of rotation.

In a device that implements an eye tracking system, the eye tracking system tracks the position of the pupil based on images of the eyes captured by eye-facing cameras to determine gaze direction; the distortion correction is updated (e.g., for each frame) for the eyepiece. The distortion correction may be updated during rendering or during post-processing of rendered images, for example. The distortion correction may be applied to images to be displayed based on the current gaze direction, for example to minimize "wobble" in the image displayed by the device. The distortion correction may be applied to make distortion corrections, as well as corrections for chromatic aberrations, optical crosstalk, foveation, vignetting, and point of view correction. However, latency between the time the eye-facing cameras capture the image(s) and the time the content is displayed introduces error. Head motion, and especially the VOR, can contribute to "wobble" in the image; in particular, the latency in the position of the pupil (and thus the gaze direction) determined by the eye tracking system may cause problems, as the pupil position and gaze direction at the time distortion is applied and the image displayed may be different than the pupil position and gaze direction estimated from images of the eyes captured by the eye-facing cameras. For example, if VOR is occurring at a medium-high speed, up to half a millimeter (mm) of error in the position of the pupil (and thus the gaze direction) may occur. Given that a total budget for error may be approximately 1 mm, VOR is a significant source of error.

Embodiments of a vestibulo-ocular reflex (VOR) eye tracking prediction method and apparatus are described that leverage head tracking functionality of the device to predict and compensate for latency caused by the VOR. In some embodiments, it may be assumed VOR motion is occurring all the time when a user is wearing the device. Head motion may be accurately detected and predicted by a head tracking system of the device based on input from an inertial motion unit (IMU), input from world-facing camera(s), or by other methods or combinations of methods. Embodiments may leverage this available head motion prediction in order to predict where the eye with the assumed VOR motion will actually be looking when an image is displayed by the system. In the method, head motion is detected, images of the eyes are captured, and the predicted head motion is used to predict VOR motion and thus gaze direction so that an image is rendered with corrections and displayed with a more accurate gaze direction than can be obtained with naïve head motion prediction and a gaze direction estimated based on images of the eyes captured by the eye-facing cameras that does not account for VOR, and thus introduces latency.

While some embodiments may assume that VOR motion is occurring all the time, there may be times when VOR is not occurring, for example during saccades or when they eyes are in "smooth pursuit" of a relatively fast-moving object (e.g., watching a tennis ball in play by turning the head with the eyes held steady on the object). However, these breaks in the assumption may not cause a significant problem in practice. During saccades, vision may be suppressed, so the person does not see much more than a blurred image on the retina. Smooth pursuit does not happen very often; more often than not, people track slow moving objects with their eyes, and the VOR is not in play. However, some embodiments may detect saccade, smooth pursuit, or no head motion conditions, and in response temporarily turn off the VOR adjustment to eye tracking.

FIG. 1 illustrates the vestibulo-ocular reflex (VOR) in a device that includes an eye tracking system, according to some embodiments. In some embodiments, a device 100 (e.g., a HMD) may include a display 130 and optics (or "eyepieces") 120 positioned in front of a user's eye 190. An eye-facing camera 140 may be positioned to capture video or images of the eye 190, in particular of the iris, pupil, and cornea surface, either directly or through the optics 120 (see FIGS. 5A-5F for examples of different eye tracking camera configurations).

During device calibration or registration, a model of the user's eye(s) may be generated based on images of the eye captured by the eye-facing camera 140. The model may include, but is not limited to, information on the center 192 of the eye, center of the pupil, eye center to pupil distance, inter-pupillary distance (IPD), and other information about the pupil, iris, and cornea surface. In use, the eye tracking system tracks the position of the pupil based on images of the eyes captured by eye-facing cameras to determine, based in part on the eye model, the current gaze direction.

In some embodiments, instead of generating a geometric 3-D eye model as described above, an anatomical model of the eye may be used. The anatomical model may, for example, be a generic eye model based on a population; the generic eye model may be adjusted for particular users based on information obtained from images or other measurements of the users' eyes. Alternatively, an anatomical model may be generated from images or other measurements of a particular user's eye. Similar information may be included in or derived from the anatomical model; however, some features of the anatomical model may be different. For example, a centroid region may be used for the center of the eye rather than a fixed point with relation to the rest of the eye model. In the discussion herein, where "eye model" is used, note that the eye model may be a geometric eye model or an anatomical eye model as described above.

FIG. 1 shows the eye with the pupil at a first position 194A and a second position 194B, with respective gaze vectors 10A and 10B determined from at least the known center 192 of the eye and the currently detected pupil position 194 (or based on a centroid region of an anatomical eye model). A rendering process updates the distortion correction (e.g., for each frame) for the eyepiece 120 to be applied to images to be displayed on display 130 based on the current gaze vector to minimize "wobble" in the image displayed by the device. However, latency between the time the eye-facing camera 140 captures the image(s) and the time the content is displayed on display 140 introduces error.

The VOR is a reflex eye movement that stabilizes images on the retina during head movement. As shown in FIG. 1, when a person is looking at an object and rotates the head, the eye 190 rotates in a direction opposite to the head motion. This occurs on the horizontal and vertical axes of rotation. When the head is rolling (ear to shoulder) the VOR reflex also occurs; however, the eyes themselves do not roll, but still effectuate horizontal and vertical rotations with respect to the head to compensate for the head roll. Head motion, and especially the VOR, can contribute to "wobble" in the image; in particular, the latency in the position 194 of the pupil (and thus the gaze vector 10) determined by the eye tracking system may cause problems, as the pupil position and gaze direction at the time distortion is applied and the image being displayed may be different than the pupil position and gaze direction estimated from images of the eye 190 captured by the eye-facing camera 140. For example, if VOR is occurring at a medium-high speed, up to half a millimeter (mm) of error in the position of the pupil (and thus the estimated gaze vector 10) may occur. Given that a total budget for error may be approximately 1 mm, VOR is a significant source of error.

Figure 2:
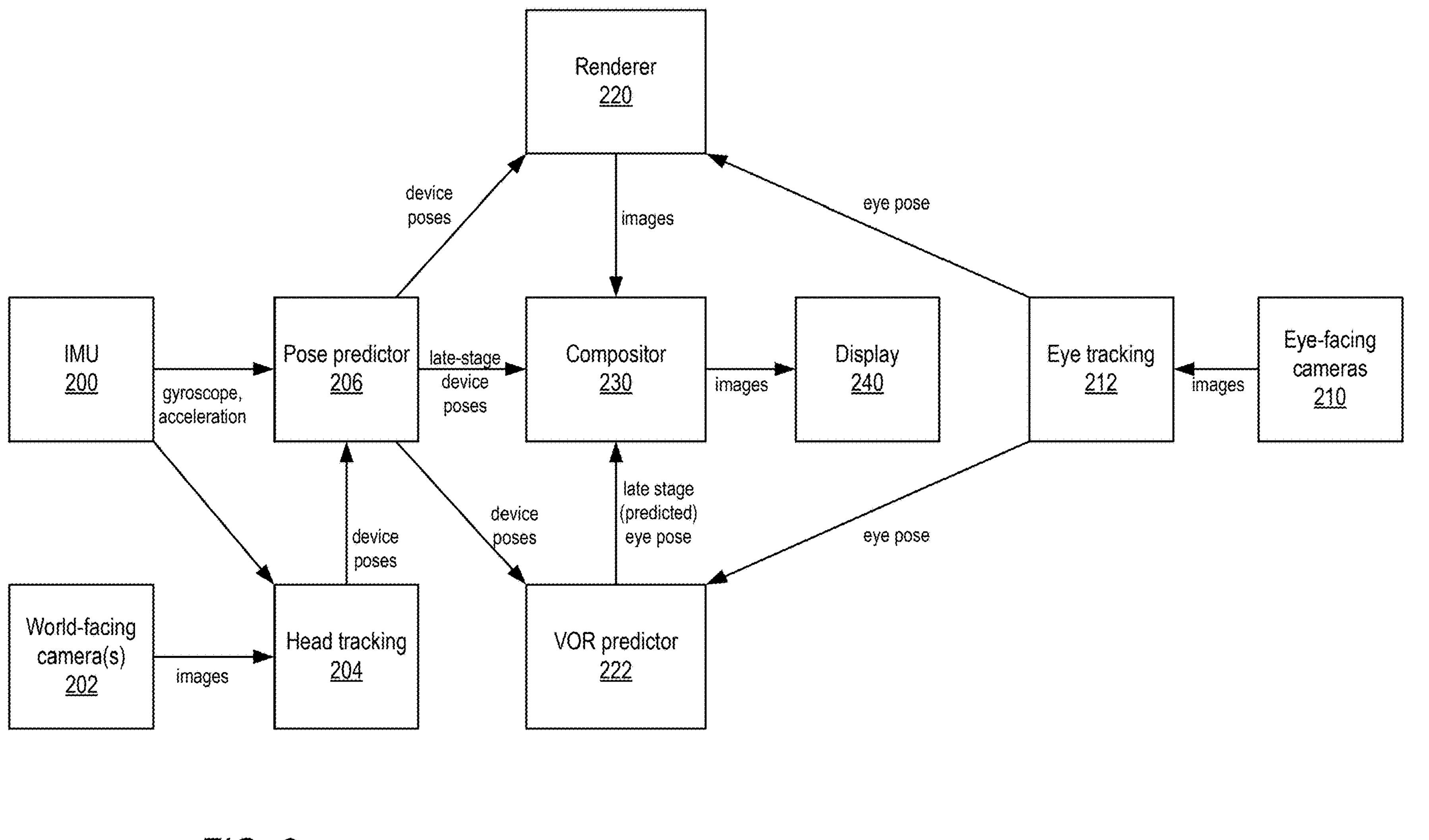
FIG. 2 is a block diagram of a method and apparatus for VOR eye tracking prediction in a device, according to some embodiments.

FIG. 2 is a block diagram of a method and apparatus for vestibulo-ocular reflex (VOR) eye tracking prediction in a device, according to some embodiments. The methods as illustrated in FIG. 2 may be implemented by processes executing on or by one or more processors of a controller which is communicatively coupled to other components such as cameras and sensors in a device such as an HMD. Example devices in which the methods and apparatus may be implemented are illustrated in FIGS. 6A-6C and FIG. 7. Embodiments may leverage head tracking functionality of the device to predict and compensate for latency caused by the VOR. In some embodiments, it may be assumed VOR motion is occurring all the time when a user is wearing the device. Head motion may be accurately detected and predicted by a head tracking system of the device based on input from an inertial motion unit (IMU), input from world-facing camera(s), or by other methods or combinations of methods. Embodiments may leverage this available head motion prediction in order to predict where the eye with the assumed VOR motion will actually be looking when an image is displayed by the system. In the method, head motion is detected, images of the eyes are captured, and the predicted head motion is used to predict VOR motion and thus gaze direction so that an image is rendered with corrections and displayed with a more accurate gaze direction than can be obtained with naïve head motion prediction and a gaze direction estimated based on images of the eyes captured by the eye-facing cameras that does not account for VOR, and thus introduces latency.

Head tracking 204 may receive input from an IMU 200 and world-facing camera(s) 202, and generates device poses (corresponding to head poses) based at least in part on the gyroscope/acceleration input received from IMU 200 and on the image(s) received from camera(s) 202. Head tracking 204 provides the device poses to pose predictor 206, which also receives low latency data from IMU 200. Pose predictor 206 generates device pose predictions based on the inputs from IMU 200 and head tracking 204.

Eye tracking 212 generates eye pose information based at least in part on images captured by eye-tracking camera(s) 210.

Renderer 220 renders initial images to be displayed based in part on device poses received from pose predictor 206 and eye pose information received from eye tracking 212. The generated images are passed to compositor 230, which reprojects the images based in part on late-stage device poses received from pose predictor 206 that may be used to better estimate poses at that moment in time.

A task of the compositor 230 is to estimate what is going to be the head pose when the image is displayed by display 240 (i.e., when photons are emitted from display 240 for the current frame). The compositor 230 also needs to compute distortion correction for the current frame to account for distortion caused by optics 120 as illustrated in FIG. 1. The distortion correction computation depends on the pupil position of the user, as different intersections of the gaze vector with the optics 120 causes different distortions. This is where the eye tracking prediction method described herein is applicable to overcome latency that results from the time lapse between when images of the eye are captured by cameras 210 and when the distortion-corrected current frame is displayed on display 240. A VOR predictor 222 derives a pupil position correction approximation from the gaze prediction using an eye geometry model (for example, a spherical eye model). Alternatively, VOR predictor 222 derives a pupil position correction approximation from the gaze prediction using an anatomical eye model.

VOR predictor 222 may implement the eye tracking prediction. Eye tracking 212 receives images of the eye(s) captured by eye tracking camera(s) and generates eye poses. VOR predictor 222 receives as input the current eye pose, the device/head pose generated by pose predictor 206, and the display time (the time when the frame in question is to be displayed). In addition, VOR predictor 222 also obtains the device/head pose that was generated at the time the eye tracking image that was used to generate the eye pose was captured. Thus, VOR predictor 222 has two device/head poses; the difference between these two device/head poses is used by VOR predictor 222 to modify the eye pose obtained from eye tracking 212 to account for the inherent latency between the time the image of the eye was captured and the time that the current frame will be displayed. VOR predictor 222 outputs the predicted eye pose information to the compositor 230, which used the predicted eye pose information to calculate the distortion mesh for the current frame.

In some embodiments, it may be assumed that VOR (which the eye pose prediction accounts for) is always occurring, and thus the eye pose correction performed by the VOR predictor may be performed for every frame to be displayed. This (VOR occurring) is typically the case when using the device, and assuming VOR works well in practice. However, there may be times when VOR is not occurring, for example during saccades, smooth pursuits, and when the head is not moving at all. Thus, in some embodiments, methods may be implemented to detect saccade, smooth pursuit, or no head motion conditions, and in response temporarily turn off the VOR adjustment to eye tracking.

As described above, compositor 230 calculates the distortion of the optical module at the time the current frame is to be displayed, and the eye pose prediction method is used to adjust the eye pose (and thus the gaze vector, determined from the fixed eye center and the dynamic pupil position) that is used in that calculation. However, compositor 230 may perform other corrections on the current frame based on eye pose information, and the eye pose prediction generated by VOR predictor 222 may also be applied in at least some of those corrections. These corrections may include, but are not limited to, adjusting resolution regionally for foveation, dynamic color compensation, and dynamic lateral chromatic aberration correction.

At a high level, a device such as an HMD includes a display and complex optics as illustrated in FIG. 1. The combination of display and complex optics does not perform uniformly; the perception of the user, geometrically or color wise, depends heavily on where the pupil is in relation to the optics and display, as the pupil location affects how the eyepiece lens transforms the rays emitted by the display. That is a primary motivation for eye tracking, and obtaining more accurate pupil predictions using the VOR prediction method described herein can help provide better compensations for effects caused by the optics/lens combination; one of the compensations that so benefits is lens distortion compensation, but other compensations may also benefit.

Figure 3:
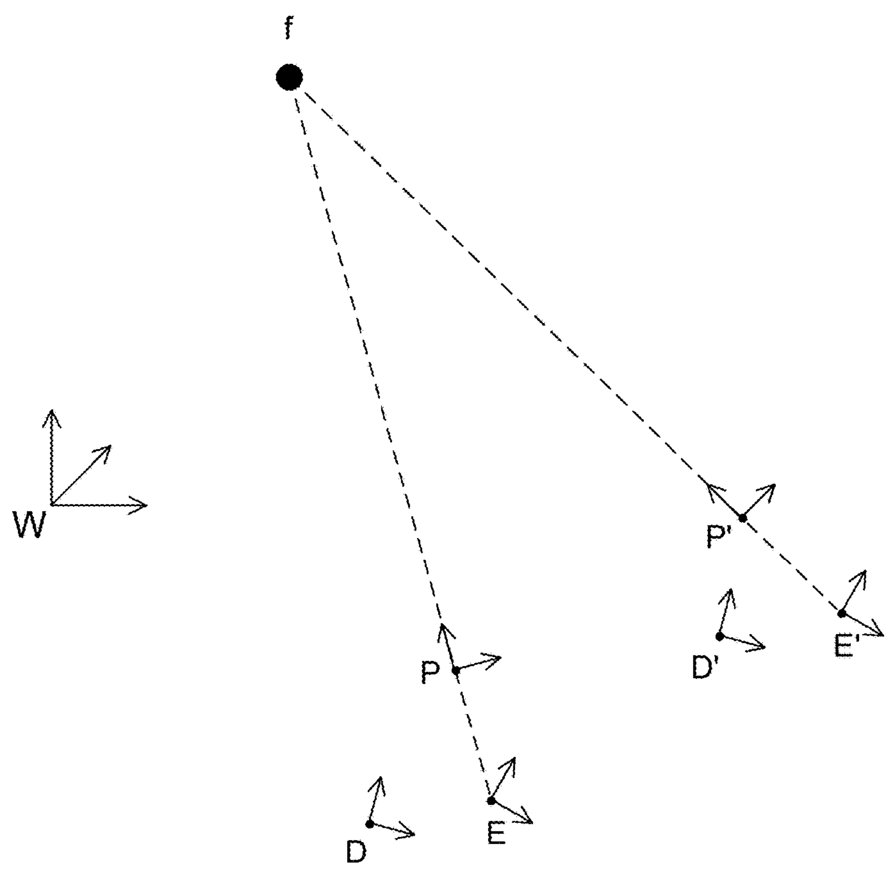
FIG. 3 graphically illustrates details of a VOR estimation method, according to some embodiments.

FIG. 3 graphically illustrates details of the VOR estimation method, according to some embodiments. The eye is considered as a sphere, and is the core of the simulation. It is assumed that the center (E) of the eye is not moving during the prediction horizon, which is typically around 40 milliseconds. If looking at a point in the world (f, the focus point), this means that the line that goes through the center E of the eye, through the pupil P, to the point f, is always going through those three points, no matter the current angle that the user is looking (the gaze angle). D is the display node (device). Motion of D corresponds to head/device motion. D to E and D' to E' rotation are the same, as it is assumed that over the prediction horizon, the eye center E does not move in the device coordinate system. If the display node D moves with respect to the fixed point f in the world W, knowing that the center of eye E is also fixed, the line can be retraced through the pupil P to determine where it is.

The two vectors correspond to two points in time: the (eye camera mid exposure, when the eye captured image(s) of the eye) and $t_d$ (display mid-exposure for the frame, which occurs after $t_e$). No prime indicates nodes at the; primes are the nodes at $t_d$. P' is where the pupil is at $t_d$. Note that D' is moving with respect to f, E' is not moving with respect to D', but P' is moving with respect to E'.

The following broadly illustrates an algorithm for performing the VOR correction.

For a given frame, it can be assumed:

$$P'|_{D'}=P|_{D}+\Delta_{VOR} \quad (1)$$

where:

$$\Delta_{VOR}={}^{D}T_{E}P'|_{E'}-{}^{D}T_{E}P|_{E} \quad (2)$$

because it is known:

$${}^{D}T_{E}\approx{}^{D'}T_{E'}$$

if time is short.

Assuming a spherical eye model:

$$P|_{E}=\frac{f|_{E}}{\|f|_{E}\|}\cdot r \quad (3)$$

where r is the pupil to eye center distance (typically ~12 mm).

${}^{W}T_{D}$ and ${}^{W}T_{D'}$ are obtained from the pose predictor. Averaging the eye center location over a period of time provides ${}^{D}T_{E}$:

$$P'|_{E'}=\frac{f|_{E'}}{\|f|_{E'}\|}\cdot r \quad (4)$$

where:

$$f|_{E'}={}^{E'}T_{E}f|_{E}={}^{E'}T_{D'}\cdot{}^{D'}T_{W}\cdot{}^{W}T_{D}\cdot{}^{D}T_{E}\cdot f|_{E}f|_{E'}={}^{D}T_{E}^{-1}\cdot{}^{W}T_{D'}^{-1}\cdot{}^{W}T_{D}\cdot{}^{D}T_{E}\cdot f|_{E} \quad (5)$$

where $f|_{E}$ is the point the user is looking at at time $t_{e}$.

Equation (5) is a model that tracks a point with the eye center just moving, and is a chain of transforms. On the right are the focus point in the eye coordinate system; on the left are the focus point in the eye coordinate system at a later time. These transforms are composed with each other from right to left, and thus should be read from right to left. The focus point is taken from the eye to the device coordinate system, then to the world coordinate system, and then are taken back to the eye at a later time.

In some embodiments, the focus point $f|_{E}$ may be determined using the distance L that the user is looking at and the gaze vector g as determined by the eye tracking algorithm. In some embodiments, L may be assumed at a fixed distance, for example at 1 meter. Assuming a fixed distance introduces some error in the calculations, but may be acceptable. In some embodiments, if binocular measurements are available, L may be estimated, for example using convergence of the eyes as determined from the left and right gaze vectors and the interpupillary distance (IPD). In these embodiments, the motion of the eye/pupil/gaze vector may be estimated utilizing the estimated distance of the user's point of attention (the estimated L) to determine focus point $f|_{E}$. Note that the closer the point of attention (focus point $f|_{E}$) is to the eye, the larger the eye rotation (VOR) is relative to the head rotation. Therefore, in some embodiments, an amount of VOR motion may be adjusted based on the estimated L.

Figure 4A:
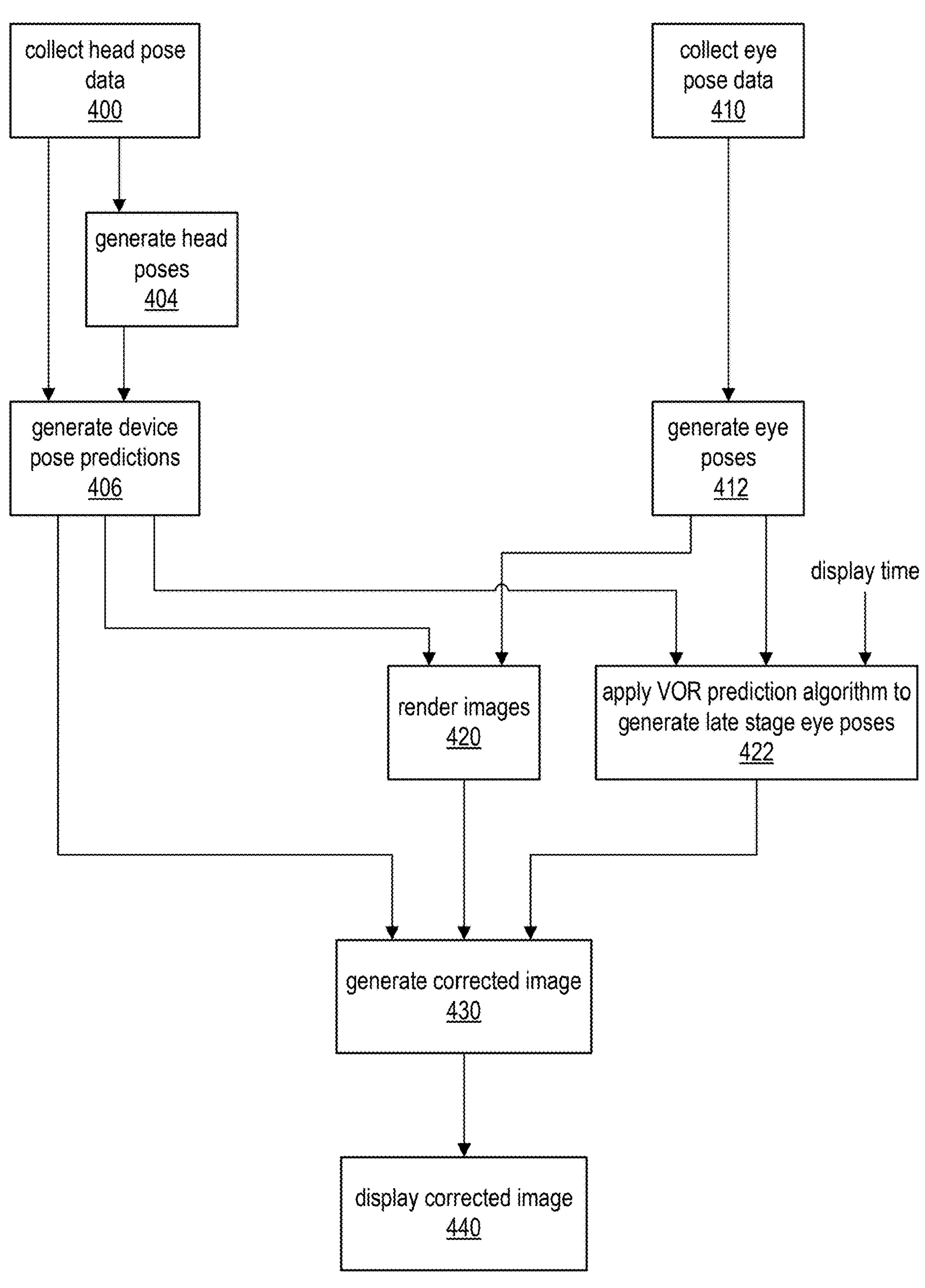
FIGS. 4A and 4B illustrate a flowchart of a method for generating corrected images using VOR estimation to account for latency between eye image capture time and display time, according to some embodiments.
Figure 4B:
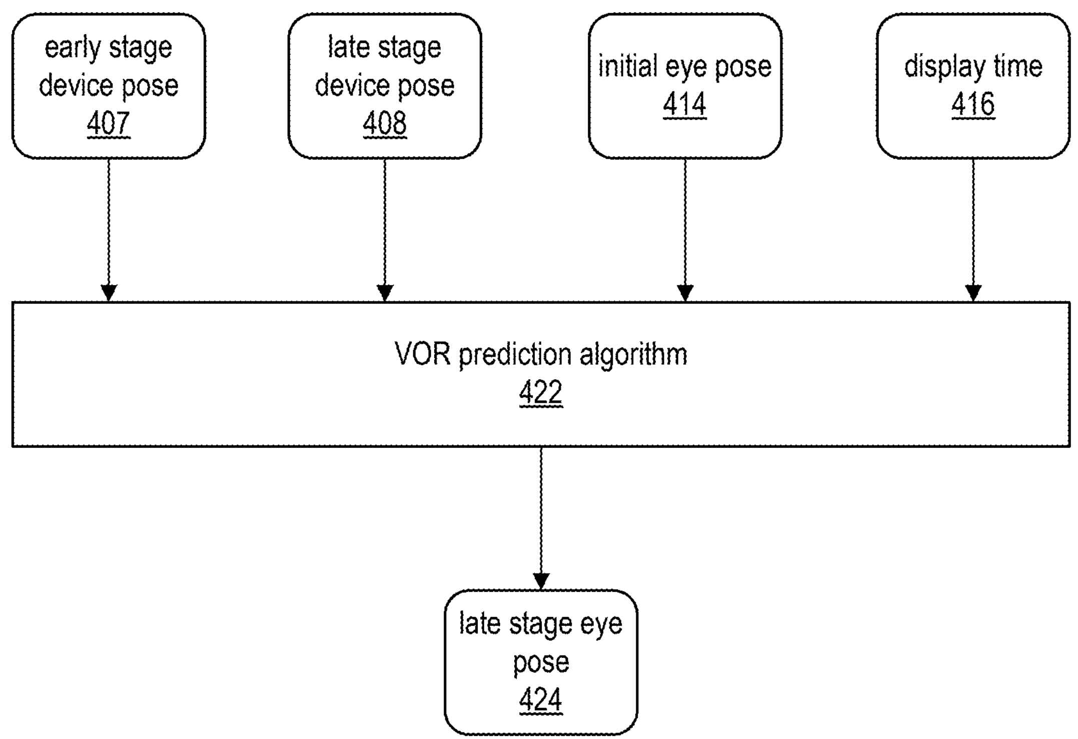

FIGS. 4A, and 4B illustrate a flowchart of a method for generating corrected images using VOR estimation to account for latency between eye image capture time and display time, according to some embodiments. The method as illustrated in FIG. 2 and described in reference to FIG. 3 may be implemented by processes executing on or by one or more processors of a controller which is communicatively coupled to other components such as cameras and sensors in a device such as an HMD. Example devices in which the methods and apparatus may be implemented are illustrated in FIGS. 6A-6C and FIG. 7. Embodiments of the method may leverage head tracking functionality of the device to predict and compensate for latency caused by the VOR. In some embodiments, it may be assumed VOR motion is occurring all the time when a user is wearing the device. Head motion may be accurately detected and predicted by a head tracking system of the device based on input from an inertial motion unit (IMU), input from world-facing camera (s), or by other methods or combinations of methods. Embodiments of the method may leverage this available head motion prediction in order to predict where the eye with the assumed VOR motion will actually be looking when an image is displayed by the system. In the method, head motion is detected, images of the eyes are captured, and the predicted head motion is used to predict VOR motion and thus gaze direction so that an image is rendered with corrections and displayed with a more accurate gaze direction than can be obtained with naïve head motion prediction and a gaze direction estimated based on images of the eyes captured by the eye-facing cameras that does not account for VOR, and thus introduces latency. Note that the method as illustrated in FIG. 4 is a continuous method that may be performed for every frame to be displayed by the device.

At 400, head pose data may be collected, for example by an IMU, one or more world-facing cameras, or by other sensors. At 404, a head tracking component may receive the head pose data and generate head poses based at least in part on the head pose data. At 406, a pose predictor receives the head poses and also receives low latency data from head pose data collection 400 and generates device pose predictions based on the inputs.

Approximately in parallel with 400-406, at 410 eye pose data (images of the eye(s)) is collected by one or more eye-facing cameras. At 412, an eye tracking component generates eye pose information based at least in part on the eye pose data.

At 420, a rendering component renders initial images to be displayed based in part on device poses received from 406 and eye pose information received from 412. The generated images are passed to a compositor component, which at 430 reprojects the images based in part on late-stage device poses received from 406 that may be used to better estimate poses at that moment in time.

A task of compositing 430 is to estimate what is going to be the head pose when the image is displayed at 440 (i.e., when photons are emitted from the display screen for the current frame). The compositing process also needs to compute distortion correction for the current frame to account for distortion caused by optics 120 as illustrated in FIG. 1. The distortion correction computation depends on the pupil position of the user's eye, as different pupil positions with respect to the optics 120 causes different distortions. This is where the eye tracking prediction method described herein is applicable to overcome latency that results from the time lapse between when images of the eye are captured by eye-facing cameras and when the distortion-corrected current frame is displayed.

A VOR prediction component may implement an embodiment of the VOR estimation method as described in reference to FIG. 3. At 412, an eye tracking component generates eye poses based on current eye pose data. At 422, the VOR prediction component receives as input the current eye pose, the device/head pose generated at 406, and the display time (the time when the frame in question is to be displayed 440). In addition, VOR prediction component also obtains from 406 the device/head pose that was generated at the time the eye tracking image that was used to generate the eye pose was captured. Thus, the VOR prediction component has two device/head poses; the difference between these two device/head poses is used to modify the eye pose obtained from eye tracking to account for the inherent latency between the time the image of the eye was captured and the time that the current frame will be displayed. The VOR prediction component outputs the predicted eye pose information to compositing 430, which used the predicted eye pose information to calculate the distortion mesh for the current frame.

FIG. 4B expands on element 422 of FIG. 4A. The VOR prediction algorithm 422 (for example, as described in reference to FIG. 3) receives as input the current or initial eye pose 414, the device/head pose 407 generated at 406, and the display time 416 (the time when the frame in question is to be displayed). In addition, VOR prediction algorithm 422 also obtains the device/head pose 408 that was generated at the time the eye tracking image that was used to generate the eye pose 414 was captured. Thus, VOR prediction algorithm 422 has two device/head poses; the difference between these two device/head poses is used to modify the eye pose 414 obtained from eye tracking to account for the inherent latency between the time the image of the eye was captured and the time 416 that the current frame will be displayed. The VOR prediction algorithm 422 outputs the predicted eye pose information (late stage eye pose 424).

In some embodiments, it may be assumed that VOR (which the eye pose prediction accounts for) is always occurring, and thus the eye pose correction performed by the VOR prediction component may be performed for every frame to be displayed. This (VOR occurring) is typically the case when using the device, and assuming VOR works well in practice. However, there may be times when VOR is not occurring, for example during saccades, smooth pursuits, and when the head is not moving at all. Thus, in some embodiments, methods may be implemented to detect saccade, smooth pursuit, or no head motion conditions, and in response temporarily turn off the VOR prediction component.

As described above, compositing 430 calculates the distortion of the optical module at the time the current frame is to be displayed 440, and the eye pose prediction method is used to adjust the eye pose (and thus the gaze vector, determined from the fixed eye center and the dynamic pupil position) that is used in that calculation. However, compositing 430 may perform other corrections on the current frame based on eye pose information, and the eye pose prediction generated by VOR prediction 422 may also be applied in at least some of those corrections. These corrections may include, but are not limited to, adjusting resolution regionally for foveation, dynamic color compensation, point of view correction, and dynamic lateral chromatic aberration correction. Eye pose information may also be used in other applications, for example in avatar representation.

At a high level, a device such as an HMD includes a display and complex optics as illustrated in FIG. 1. The combination of display and complex optics does not perform uniformly; the perception of the user, geometrically or color wise, depends heavily on where the pupil is in relation to the optics and display, as the pupil location affects where the gaze vector intersects the optics and display. Specifically, the optical properties of the eyepiece may differ depending on the pupil location with respect to the eyepiece, and thus the compensations to be applied depend on the pupil location. That is a primary motivation for eye tracking, and obtaining more accurate pupil predictions using the VOR prediction method described herein can help provide better compensations for effects caused by the optics/lens combination; one of the compensations that so benefits is lens distortion compensation, but other compensations may also benefit.

Figure 5A:
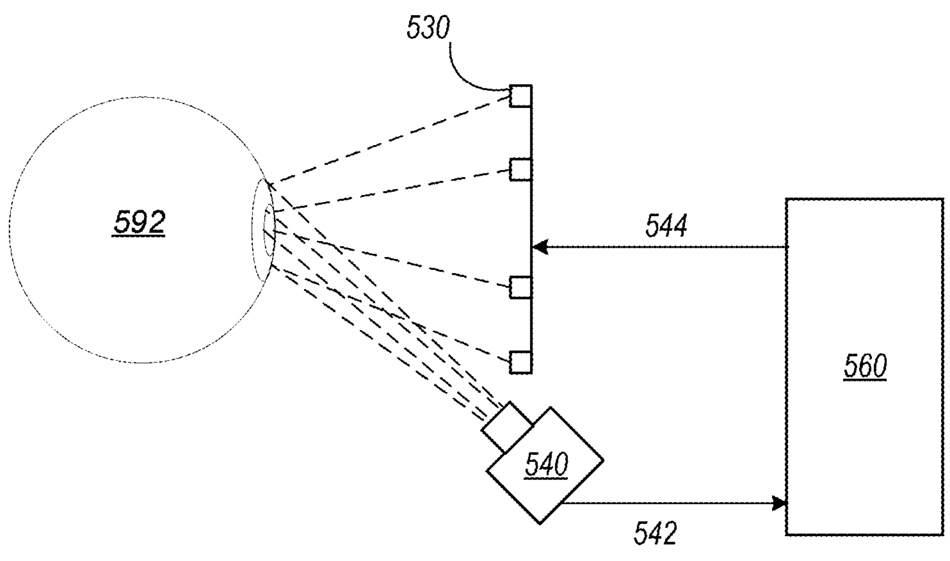
FIGS. 5A through 5F illustrate example eye camera systems, according to some embodiments.
Figure 5B:
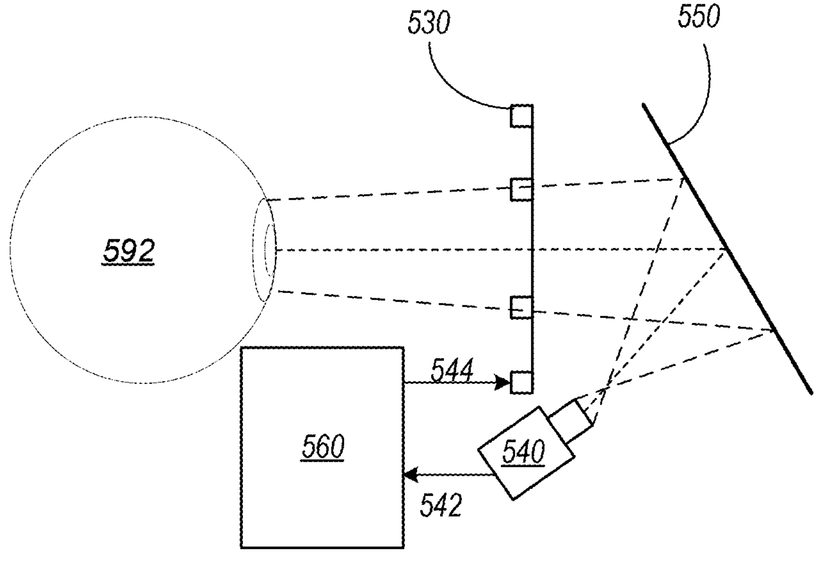
Figure 5C:
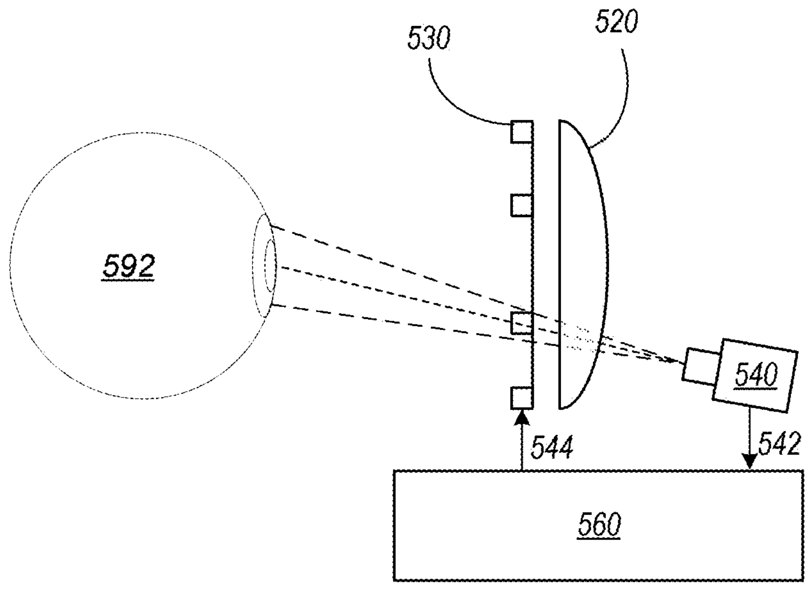

FIGS. 5A through 5F illustrate example eye camera systems, according to some embodiments. Note that other imaging systems may be used than those shown in these Figures, for example scanning laser-based eye tracking systems. An imaging system may include, but is not limited to, one or more cameras 540, an illumination source 530, and a controller 560. FIG. 5A shows an imaging system in which the eye camera 540 images the eye 592 directly. However, in some embodiments the eye camera 540 may instead image a reflection of the eye 592 off of a hot mirror 550 as shown in FIG. 5B. In addition, in some embodiments, the eye camera 540 may image the eye through a lens 520 of an imaging system, for example as shown in FIG. 5C.

Figure 5D:
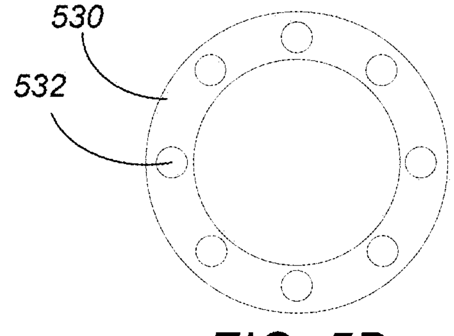

In some embodiments, a device (e.g., a head-mounted device (HMD)) may include an imaging system that includes at least one eye camera 540 (e.g., visible light and/or infrared (IR) cameras) positioned on one side or at each side of the user's face, and an illumination source 530 (e.g., point light sources such as an array or ring of IR light-emitting diodes (LEDs)) that emits light towards the user's eye(s) 592 or periorbital region. FIG. 5D shows an example illumination source 530 that includes multiple LEDs 532. In this example, there are eight LEDs 532 arranged in a ring. Note, however, that the number and arrangement of the LEDS 532 in an illumination source 530 may be different. In addition, in some embodiments other light-emitting elements than LEDs may be used. In some embodiments, the LEDs 532 may be configured to emit light in the IR or NIR range, for example at 740, 750, 840, 850, 940, or 950 nanometers.

Figure 5E:
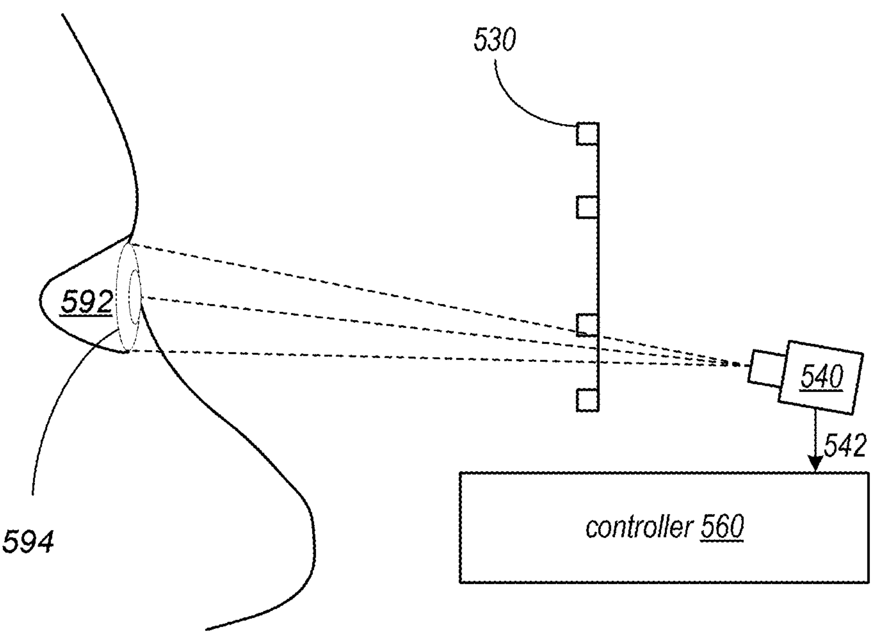
Figure 5F:
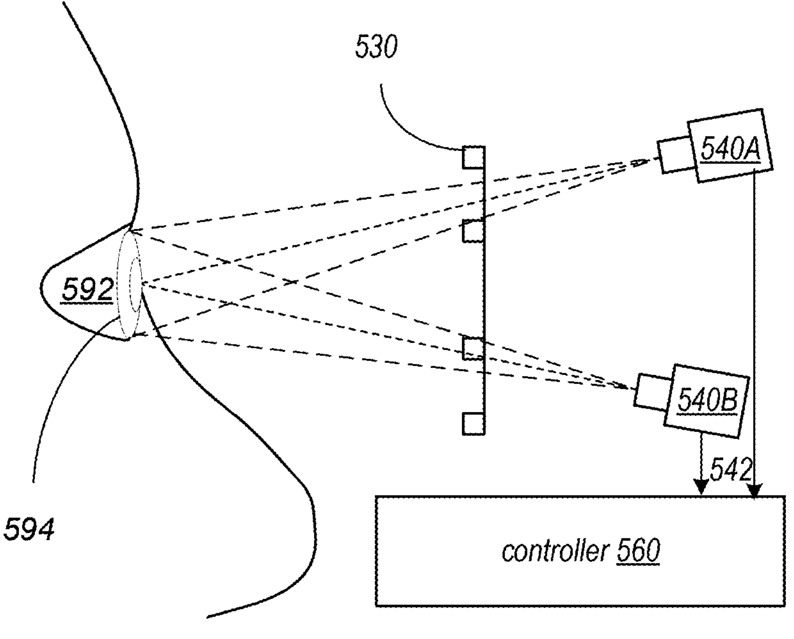

In embodiments, an eye camera 540 may be pointed towards the eye 592 to receive light from the illumination source 530 reflected from the eye 592, as shown in FIG. 5A. However, in some embodiments the eye camera 540 may instead image a reflection of the eye 592 off of a hot mirror 550 as shown in FIG. 5B. In addition, in some embodiments, the eye camera 540 may image the eye 592 through a lens 520 or other optical element of the device, for example as shown in FIG. 5C. Some embodiments may include a single camera 540 that captures images of a user's eye 592, as illustrated in FIG. 5E. Some embodiments may include two or more cameras 540 that capture images of a user's eye 592, as illustrated in FIG. 5F.

The device that includes an imaging system as illustrated in FIGS. 5A through 5F may include a controller 560 comprising one or more processors and memory. Controller 560 may include one or more of various types of processors, image signal processors (ISPs), graphics processing units (GPUs), coder/decoders (codecs), and/or other components for processing and rendering video and/or images. In some embodiments, the controller 560 may be integrated in the device. In some embodiments, at least some of the functionality of the controller 560 may be implemented by an external device coupled to the device by a wired or wireless connection. While not shown in FIGS. 5A through 5F, in some embodiments, controller 560 may be coupled to an external memory for storing and reading data and/or software.

The controller 560 may send control signals to the illumination source 530 and camera(s) 540 to control the illumination of the eye 592 and to capture images of the eye 592. The controller 560 may use the images 542 of the eyes 592 captured by the eye camera(s) 540 during an enrollment process to construct or adjust a 3D model of the eye 592. The eye model may then be used for one or more purposes. For example, the controller 560 may implement gaze tracking algorithms that estimate the user's gaze direction based on additional images 542 captured by the camera(s) and the eye model generated during the enrollment process. A gaze tracking algorithm may, for example, process images 542 captured by the cameras 540 to identify glints (reflections of the LEDs 530) obtained from the eye cameras 540, pupil position and diameter, or other features of the eyes, and apply this information to the eye model to determine and track the direction in which the user is currently looking (the gaze direction) or the position of the eye in space (e.g., position relative to the HMD). In some embodiments, instead of a geometric eye model, an anatomical eye model may be used.

Figure 6A:
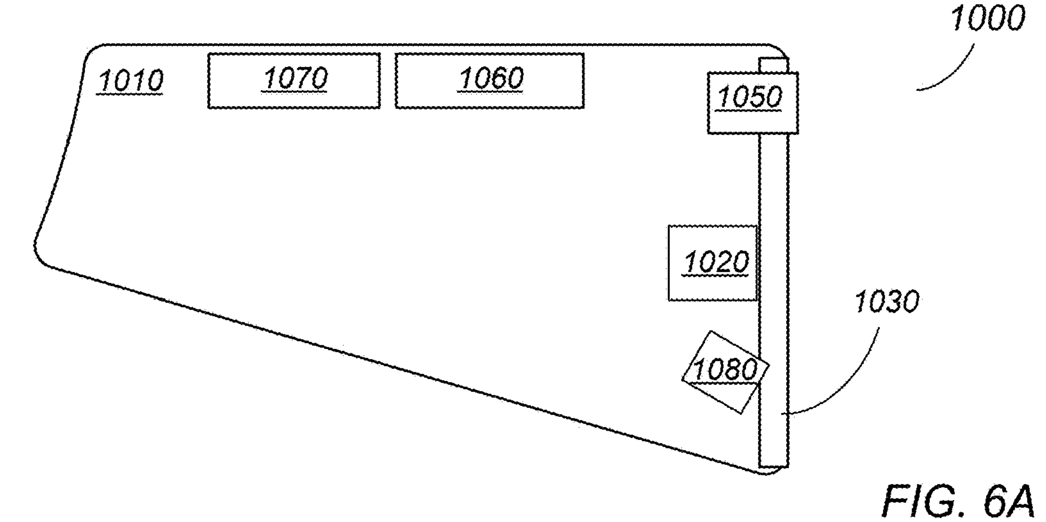
FIGS. 6A through 6C illustrate example devices in which the methods of FIGS. 1 through 5B may be implemented, according to some embodiments.
Figure 6B:
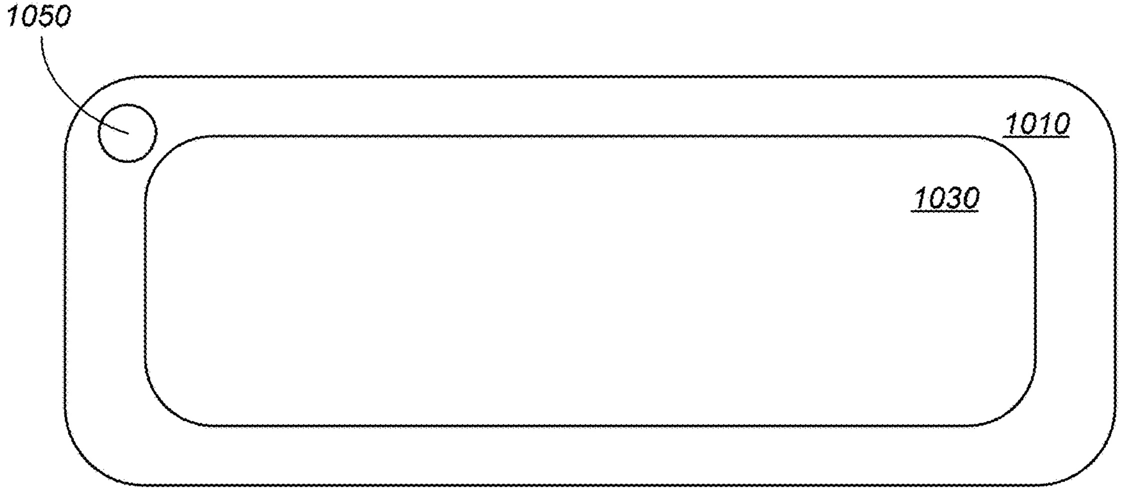
Figure 6C:
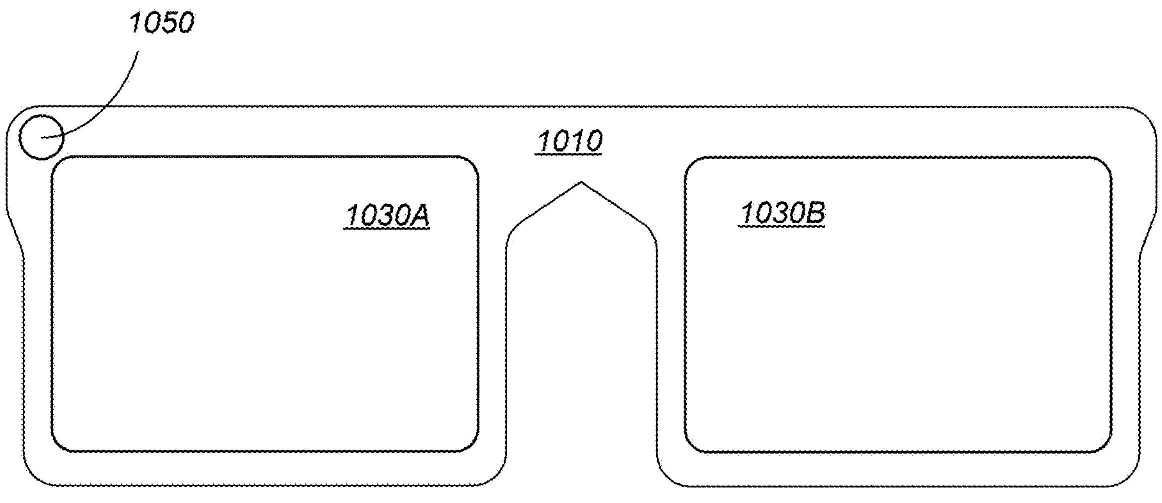

FIGS. 6A through 6C illustrate example devices in which the methods of FIGS. 1 through 5B may be implemented, according to some embodiments. Note that the HMDs 1000 as illustrated in FIGS. 6A through 6C are given by way of example, and are not intended to be limiting. In various embodiments, the shape, size, and other features of an HMD 1000 may differ, and the locations, numbers, types, and other features of the components of an HMD 1000 and of the eye imaging system. FIG. 6A shows a side view of an example HMD 1000, and FIGS. 6B and 6C show alternative front views of example HMDs 1000, with FIG. 6A showing device that has one lens 1030 that covers both eyes and FIG. 6B showing a device that has right 1030A and left 1030B lenses.

HMD 1000 may include lens(es) 1030, mounted in a wearable housing or frame 1010. HMD 1000 may be worn on a user's head (the "wearer") so that the lens(es) is disposed in front of the wearer's eyes. In some embodiments, an HMD 1000 may implement any of various types of display technologies or display systems. For example, HMD 1000 may include a display system that directs light that forms images (virtual content) through one or more layers of waveguides in the lens(es) 1020; output couplers of the waveguides (e.g., relief gratings or volume holography) may output the light towards the wearer to form images at or near the wearer's eyes. As another example, HMD 1000 may include a direct retinal projector system that directs light towards reflective components of the lens(es); the reflective lens(es) is configured to redirect the light to form images at the wearer's eyes.

In some embodiments, HMD 1000 may also include one or more sensors that collect information about the wearer's environment (video, depth information, lighting information, etc.) and about the wearer (e.g., eye or gaze tracking sensors, head motion sensors, etc.). The sensors may include one or more of, but are not limited to one or more eye tracking cameras 1020 (e.g., infrared (IR) cameras) that capture views of the user's eyes, one or more world-facing or PoV cameras 1050 (e.g., RGB video cameras) that can capture images or video of the real-world environment in a field of view in front of the user, and one or more ambient light sensors that capture lighting information for the environment. Cameras 1020 and 1050 may be integrated in or attached to the frame 1010. HMD 1000 may also include one or more light sources 1080 such as LED or infrared point light sources that emit light (e.g., light in the IR portion of the spectrum) towards the user's eye or eyes.

A controller 1060 for the XR system may be implemented in the HMD 1000, or alternatively may be implemented at least in part by an external device (e.g., a computing system or handheld device) that is communicatively coupled to HMD 1000 via a wired or wireless interface. Controller 1060 may include one or more of various types of processors, image signal processors (ISPs), graphics processing units (GPUs), coder/decoders (codecs), system on a chip (SOC), CPUs, and/or other components for processing and rendering video and/or images. In some embodiments, controller 1060 may render and composite frames (each frame including a left and right image) that include virtual content based at least in part on inputs obtained from the sensors and from an eye tracking system, and may provide the frames to the display system.

Memory 1070 for the XR system may be implemented in the HMD 1000, or alternatively may be implemented at least in part by an external device (e.g., a computing system) that is communicatively coupled to HMD 1000 via a wired or wireless interface. The memory 1070 may, for example, be used to record video or images captured by the one or more cameras 1050 integrated in or attached to frame 1010. Memory 1070 may include any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used in an HMD to store processed data, such as Flash or other "hard drive" technologies. This other storage may be separate from the externally coupled storage mentioned below.

While FIGS. 6A through 6C only show light sources 1080 and cameras 1020 and 1050 for one eye, embodiments may include light sources 1080 and cameras 1020 and 1050 for each eye, and gaze tracking may be performed for both eyes. In addition, the light sources, 1080, eye tracking camera 1020 and PoV camera 1050 may be located elsewhere than shown.

Embodiments of an HMD 1000 as illustrated in FIGS. 6A-6C may, for example, be used in augmented or mixed (AR) applications to provide augmented or mixed reality views to the wearer. HMD 1000 may include one or more sensors, for example located on external surfaces of the HMD 1000, that collect information about the wearer's external environment (video, depth information, lighting information, etc.); the sensors may provide the collected information to controller 1060 of the XR system. The sensors may include one or more visible light cameras 1050 (e.g., RGB video cameras) that capture video of the wearer's environment that, in some embodiments, may be used to provide the wearer with a virtual view of their real environment. In some embodiments, video streams of the real environment captured by the visible light cameras 1050 may be processed by the controller 1060 of the HMD 1000 to render augmented or mixed reality frames that include virtual content overlaid on the view of the real environment, and the rendered frames may be provided to the display system. In some embodiments, input from the eye tracking camera 1020 may be used in a PCCR gaze tracking process executed by the controller 1060 to track the gaze/pose of the user's eyes for use in rendering the augmented or mixed reality content for display. In addition, one or more of the methods as illustrated in FIGS. 1 through 4 may be implemented in the HMD to generate corrected images using VOR estimation to account for latency between eye image capture time and display time.

Figure 7:
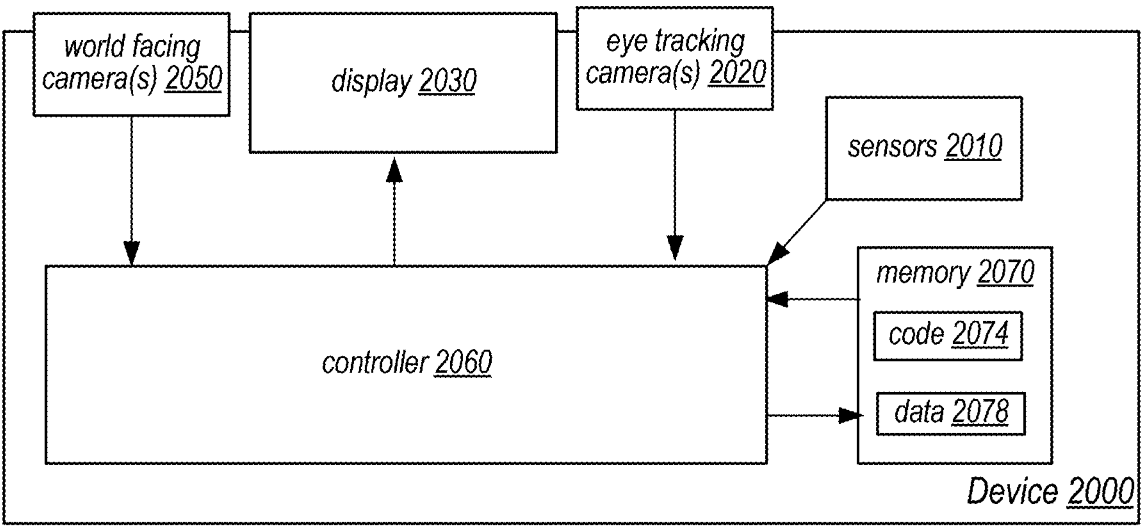
FIG. 7 is a block diagram illustrating an example device that may include components and implement methods as illustrated in FIGS. 1 through 5B, according to some embodiments.

FIG. 7 is a block diagram illustrating an example device that may include components and implement methods as illustrated in FIGS. 1 through 6B, according to some embodiments.

In some embodiments, an XR system may include a device 2000 such as a headset, helmet, goggles, or glasses. Device 2000 may implement any of various types of display technologies. For example, device 2000 may include a transparent or translucent display 2060 (e.g., eyeglass lenses) through which the user may view the real environment and a medium integrated with display 2060 through which light representative of virtual images is directed to the wearer's eyes to provide an augmented view of reality to the wearer.

In some embodiments, device 2000 may include a controller 2060 configured to implement functionality of the XR system and to generate frames (each frame including a left and right image) that are provided to display 2030. In some embodiments, device 2000 may also include memory 2070 configured to store software (code 2074) of the XR system that is executable by the controller 2060, as well as data 2078 that may be used by the XR system when executing on the controller 2060. In some embodiments, memory 2070 may also be used to store video captured by camera 2050. In some embodiments, device 2000 may also include one or more interfaces (e.g., a Bluetooth technology interface, USB interface, etc.) configured to communicate with an external device (not shown) via a wired or wireless connection. In some embodiments, at least a part of the functionality described for the controller 2060 may be implemented by the external device. The external device may be or may include any type of computing system or computing device, such as a desktop computer, notebook or laptop computer, pad or tablet device, smartphone, hand-held computing device, game controller, game system, and so on.

In various embodiments, controller 2060 may be a uniprocessor system including one processor, or a multiprocessor system including several processors (e.g., two, four, eight, or another suitable number). Controller 2060 may include central processing units (CPUs) configured to implement any suitable instruction set architecture, and may be configured to execute instructions defined in that instruction set architecture. For example, in various embodiments controller 2060 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2060 may employ any microarchitecture, including scalar, superscalar, pipelined, superpipelined, out of order, in order, speculative, non-speculative, etc., or combinations thereof. Controller 2060 may include circuitry to implement microcoding techniques. Controller 2060 may include one or more processing cores each configured to execute instructions. Controller 2060 may include one or more levels of caches, which may employ any size and any configuration (set associative, direct mapped, etc.). In some embodiments, controller 2060 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2060 may include one or more other components for processing and rendering video and/or images, for example image signal processors (ISPs), coder/decoders (codecs), etc.

Memory 2070 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used to store processed data, such as Flash or other "hard drive" technologies.

In some embodiments, device 2000 may include one or more sensors 2010 that collect information about the user's environment (video, depth information, lighting information, head motion and pose information etc.). The sensors 2010 may provide the information to the controller 2060 of the XR system. In some embodiments, the sensors 2010 may include, but are not limited to, at least one visible light camera (e.g., an RGB video camera) 2050, ambient light sensors, an IMU (inertial measurement unit), and at least on eye tracking camera 2020. In some embodiments, device 2000 may also include one or more IR light sources; light from the light sources reflected off the eye may be captured by the eye tracking camera 2020. Gaze tracking algorithms implemented by controller 2060 may process images or video of the eye captured by the camera 2020 to determine eye pose and gaze direction. In addition, one or more of the methods as illustrated in FIGS. 1 through 4 may be implemented in device 2000 to generate corrected images using VOR estimation to account for latency between eye image capture time and display time.

In some embodiments, device 2000 may be configured to render and display frames to provide an augmented or mixed reality (MR) view for the user based at least in part according to sensor inputs, including input from the eye tracking camera 2020. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by the XR system and composited with the displayed view of the user's real environment.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
- one or more head motion sensors configured to collect head motion data;
- a camera configured to capture images of an eye; and
- a controller comprising one or more processors configured to:
  - process head motion data captured by the one or more head motion sensors to generate first device pose information for a first time corresponding to when an image of the eye was captured by the camera and second device pose information for a second time subsequent to the first time; and
  - process the image of the eye to generate eye pose information including a pupil position and a gaze vector;
  - estimate vestibulo-ocular reflex (VOR) motion of the eye based on a difference between the first device pose information and the second device pose information; and
  - adjust the pupil position and the gaze vector based at least in part on the estimated VOR motion of the eye.

2. The device as recited in claim 1, wherein, to process the image of the eye captured by the camera to generate eye pose information including a pupil position and a gaze vector, the controller is configured to:
- obtain the first device pose information based on head pose data corresponding to a head pose at a time that the image of the eye was captured; and
- obtain the second device pose information based at least in part on head pose data corresponding to a head pose at a later time than the time that the image of the eye was captured.

3. The device as recited in claim 2, wherein the later time corresponds to a time at which a current frame being composited by the controller is to be displayed by a display subsystem of the device.

4. The device as recited in claim 1, further comprising a display subsystem configured to display frames to an eye, and wherein the controller is further configured to:
- apply one or more corrections to an image based at least in part on the adjusted pupil position and gaze vector, wherein the pupil position and gaze vector account for VOR motion of the eye between a time that the image of the eye was captured and a time that the current frame is to be displayed; and
- provide the corrected image to the display subsystem as the current frame.

5. The device as recited in claim 4, wherein the one or more include a correction for distortion caused by an eyepiece located between the eye and a display screen of the display subsystem, wherein the correction to be applied for the distortion caused by the eyepiece depends on the pupil position with respect to the eyepiece.

6. The device as recited in claim 1, wherein, to process an image of the eye captured by the camera to generate eye pose information including a pupil position and a gaze vector based at least in part on the device pose information to account for VOR motion of the eye, the controller is further configured to generate the eye pose information based at least in part on a geometric model of the eye.

7. The device as recited in claim 1, wherein, to process an image of the eye captured by the camera to generate eye pose information including a pupil position and a gaze vector based at least in part on the device pose information to account for VOR motion of the eye, the controller is further configured to generate the eye pose information based at least in part on an anatomical model of the eye.

8. The device as recited in claim 1, wherein, to process an image of the eye captured by the camera to generate eye pose information including a pupil position and a gaze vector based at least in part on the device pose information to account for VOR motion of the eye, the controller is further configured to estimate distance of a focus point, wherein the estimated distance of the focus point is used to adjust an amount of VOR motion.

9. The device as recited in claim 1, wherein the one or more head motion sensors include an inertial motion unit (IMU).

10. The device as recited in claim 1, wherein the device is a head-mounted device (HMD) of an extended reality (XR) system.

11. A method, comprising:

performing, by a controller comprising one or more processors:

processing an image of the eye captured by a camera to generate eye pose information including a pupil position and a gaze vector;

processing head motion data captured by one or more head motion sensors to generate first device pose information for a first time corresponding to when an image of the eye was captured by the camera and second device pose information for a second time subsequent to the first time;

processing the image of the eye to generate eye pose information including a pupil position and a gaze vector;

estimating vestibulo-ocular reflex (VOR) motion of the eye based on a difference between the first device pose information and the second device pose information; and adjusting the pupil position and the gaze vector based at least in part on the estimated VOR motion of the eye.

12. The method as recited in claim 11, further comprising:

obtaining the first device pose information based on head pose data corresponding to a head pose at a time that the image of the eye was captured;

obtaining the second device pose information based at least in part on head pose data corresponding to a head pose at a later time than the time that the image of the eye was captured.

13. The method as recited in claim 12, wherein the later time corresponds to a time at which a current frame being composited by the controller is to be displayed by a display subsystem of the device.

14. The method as recited in claim 11, further comprising:

correcting an image based at least in part on the adjusted pupil position and gaze vector, wherein the adjusted pupil position and gaze vector account for VOR motion of the eye between a time that the image of the eye was captured and a time that the current frame is to be displayed; and causing the corrected image to be displayed as the current frame.

15. The method as recited in claim 14, wherein correcting the image includes correcting for distortion caused by an eyepiece located between the eye and a display screen of the display subsystem, wherein the correction to be applied for the distortion caused by the eyepiece depends on the pupil position with respect to the eyepiece.

16. The method as recited in claim 14, wherein correcting the image includes one or more of corrections for distortions, chromatic aberrations, optical crosstalk, foveation, vignetting, and point of view.

17. The method as recited in claim 11, wherein the controller and camera are components of a head-mounted device (HMD) of an extended reality (XR) system.

18. A system, comprising:

a head-mounted device (HMD), comprising a display subsystem configured to display virtual content to an eye;

one or more head motion sensors configured to collect head motion data;

a camera configured to capture images of the eye; and a controller comprising one or more processors configured to:

process head motion data captured by the one or more head motion sensors to generate first device pose information for a first time corresponding to when an image of the eye was captured by the camera and second device pose information for a second time subsequent to the first time;

process the image of the eye to generate eye pose information including a pupil position and a gaze vector;

estimate vestibulo-ocular reflex (VOR) motion of the eye based on a difference between the first device pose information and the second device pose information;

adjust the pupil position and gaze vector based at least in part on the estimated VOR motion of the eye;

apply one or more corrections to an image based at least in part on the adjusted pupil position and gaze vector; and provide the corrected image to the display subsystem as the current frame.

19. The system as recited in claim 18, wherein, to process the image of the eye captured by the camera to generate eye pose information including a pupil position and a gaze vector, the controller is configured to:

obtain the first device pose information based on head pose data corresponding to a head pose at a time that the image of the eye was captured; and obtain the second device pose information based at least in part on head pose data corresponding to a head pose at a later time than the time that the image of the eye was captured, wherein the later time corresponds to a time at which a current frame being composited by the controller is to be displayed by a display subsystem of the device.

20. The system as recited in claim 18, wherein the one or more corrections include a correction for distortion caused by an eyepiece located between the eye and a display screen of the display subsystem, wherein the correction to be applied for the distortion caused by the eyepiece depends on the pupil position with respect to the eyepiece.

* * * * *